United States Patent [19]

Balko et al.

[11] 4,339,322

[45] Jul. 13, 1982

[54] CARBON FIBER REINFORCED FLUOROCARBON-GRAPHITE BIPOLAR CURRENT COLLECTOR-SEPARATOR

[75] Inventors: Edward N. Balko, Wilmington, Mass.; Richard J. Lawrance, Hampstead, N.H.

[73] Assignee: General Electric Company, Wilmington, Mass.

[21] Appl. No.: 142,583

[22] Filed: Apr. 21, 1980

[51] Int. Cl.$^3$ .................... C25B 11/00; C25B 11/12
[52] U.S. Cl. .................. 204/255; 204/294; 204/286; 429/38; 429/210
[58] Field of Search ............ 204/294, 296, 255, 98, 204/268; 429/38, 39, 210

[56] References Cited

U.S. PATENT DOCUMENTS

| | | | |
|---|---|---|---|
| 3,134,696 | 5/1964 | Douglas et al. | 429/30 |
| 4,057,479 | 11/1977 | Campbell | 204/258 |
| 4,197,178 | 4/1980 | Pellegri et al. | 204/255 |
| 4,214,969 | 7/1980 | Lawrance | 204/255 |
| 4,265,727 | 5/1981 | Beckley | 204/242 |

*Primary Examiner*—F. Edmundson
*Attorney, Agent, or Firm*—I. David Blumenfeld

[57] ABSTRACT

A bipolar current collector-separator for electrochemical cells consists of a molded aggregate of electro-conductive graphite and a thermoplastic fluoropolymer particles reinforced with carbon fibers to increase the strength and maintain high electrical conductivity. The graphite and the thermoplastic fluoropolymer are combined in weight ratio ranging from 2.5:1 to 16:1. The carbon fibers may constitute from 10 to 80 weight percent of the conductive graphite. The bulk resistivity of such a molded bipolar current collector is less than $4 \times 10^{-3}$ ohm inches ($\sigma$ in.) It has excellent corrosion resistance to a variety of feed stocks such as brine, aqueous HCl, water, etc. and to various electrolysis products, such as caustic, chlorine, hydrogen, etc.

This invention relates to a molded, conductive, fiber reinforced, current collecting-separator structure for electrochemical cells and, more particularly, to one utilizing thermoplastic fluoropolymer resin binders for bonding electroconductive particles into a solid, current collecting-separator structure reinforced by carbon or graphite fibers or fiber structures.

8 Claims, 4 Drawing Figures

CARBON FIBER REINFORCED FLUOROCARBON-GRAPHITE BIPOLAR CURRENT COLLECTOR-SEPARATOR

An application filed Jan. 2, 1979, Ser. No. 489, now U.S. Pat. No. 4,214,969 in the name of Richard J. Lawrance entitled "Low Cost Bipolar Current Collector-Separator for Electrochemical Cells" assigned to the General Electric Company, the assignee of the present invention, describes a bipolar current collector which is a molded aggregate of electroconductive graphite and of a thermoplastic fluoropolymer such as polyvinilidene fluoride. The molded bipolar current collector described in that application has excellent bulk resistivity, excellent corrosion resistance to feed stocks and electrolysis products and good flexual strength through a temperature range of 180°–300° F. However, it has been found that the physical strength of such a molded composite can be increased substantially, without significant loss in electrical conductivity by substituting carbon fibers or other fibrous carbon structures for some of the graphite.

It is therefore an objective of the invention to provide a current conducting, bipolar, separator for electrochemical cells comprising a molded aggregate of conductive particles and a thermoplastic fluoropolymer binder reinforced with conductive reinforcing elements.

It is another objective of the invention to provide a molded bipolar separator reinforced with conductive fibers which has excellent conductivity and improved physical strength.

Other objectives and advantages of the invention will become clear as the description thereof proceeds.

In accordance with the invention, a multi-ribbed, current conducting, bipolar separator is provided which is a molded aggregate of electrically conductive particles, (preferably carbon or graphite), and of a thermoplastic fluoropolymer resin in weight ratios from 2.5:1 to 16:1 reinforced with conductive carbon or graphite fibers or mats. The conductive fibers constitute from 10 to 80 weight percent of the conductive portion of the molded aggregate.

The novel features which are believed to be characteristic of this invention are set forth with particularity in the appended claims. The invention itself, however, both as to its construction and method of operation, together with further objectives and advantages thereof may best be understood by reference to the following description taken in connection with the accompanying drawings in which:

The current collector-separator of the instant invention is a pressure molded aggregate of conductive particles (preferably graphite), and a fluoropolymer resin which is reinforced by the inclusion of conductive carbon fibers. A plurality of projections, preferably elongated ribs are provided on opposite surfaces of the collector and for reasons presently described, are angularly disposed to each other. A bipolar collector so constructed is particularly useful for contacting and allowing electron current flow to catalytic electrodes bonded to the surfaces of ion transporting membranes forming part of electrochemical electrolysis cells of the sort shown in application Ser. No. 922,316 filed July 6, 1978 entitled PRODUCTION OF HALOGENS ELECTROLYSIS OF ALKALI METAL HALIDES IN AN ELECTROLYSIS CELL HAVING CATALYTIC ELECTRODES BONDED TO THE SURFACE OF A SOLID POLYMER ELECTROLYTE MEMBRANE, assigned to the General Electric Company, the assignee of the present invention.

The resistivity in ohm-inches of such a reinforced, graphite fluoropolymer current collector-separator is less than $4 \times 10^{-3}$ ohms/inch for formulations containing 30 weight % or less of the nonconductive fluoropolymer resin. Specifically, with the fluoropolymer weight percentages between 6–28% the resistivity varies from 1.9 to $3.5 \times 10^{-3}$ ohm inches. This represents a 0.4 to 0.8 milivolt loss (IR drop) per thousand ASF. The preferred size for the conductive graphite-carbon particles is approximately 44 microns or alternatively, the average particle size is such that 99% of the carbon/graphite particles pass through a 325 mesh sieve. The graphite may be in the form of a graphite powder such as a graphite sold by Union Carbide under its designation grade DP195. The fluoropolymer resin is preferably polyviniledene fluoride which is available commercially from the PENNWALT Corporation under its trade designation KYNAR. Commercially available KYNAR 461 polyviniledene fluoride has a 5 micron average particle diameter with aglomerates of approximately 45 mils in diameter. Other fluoropolymer resins such as tetrafluoroethylene, etc. may be utilized with equal facility although the polyviniledene fluoride is preferred as it is a low cost material and has a lower molding temperature ($T_M = 590°–630°$ F.), than most other fluoropolymers.

Although carbon and graphite particles are preferred metallic particles may also be used although a molded aggregate utilizing the metallic particles would be somewhat susceptible to hydrogen embrittlement although less so than the metallic collector. The carbon or graphite reinforcing fibers are preferably hammer-milled fibers of 0.25 inch mean fiber length and a diameter on the average of 0.05 inches. The mean length of the fibers is not critical although the range of 0.075 inches of 0.005 inches is preferred.

Figure 1:
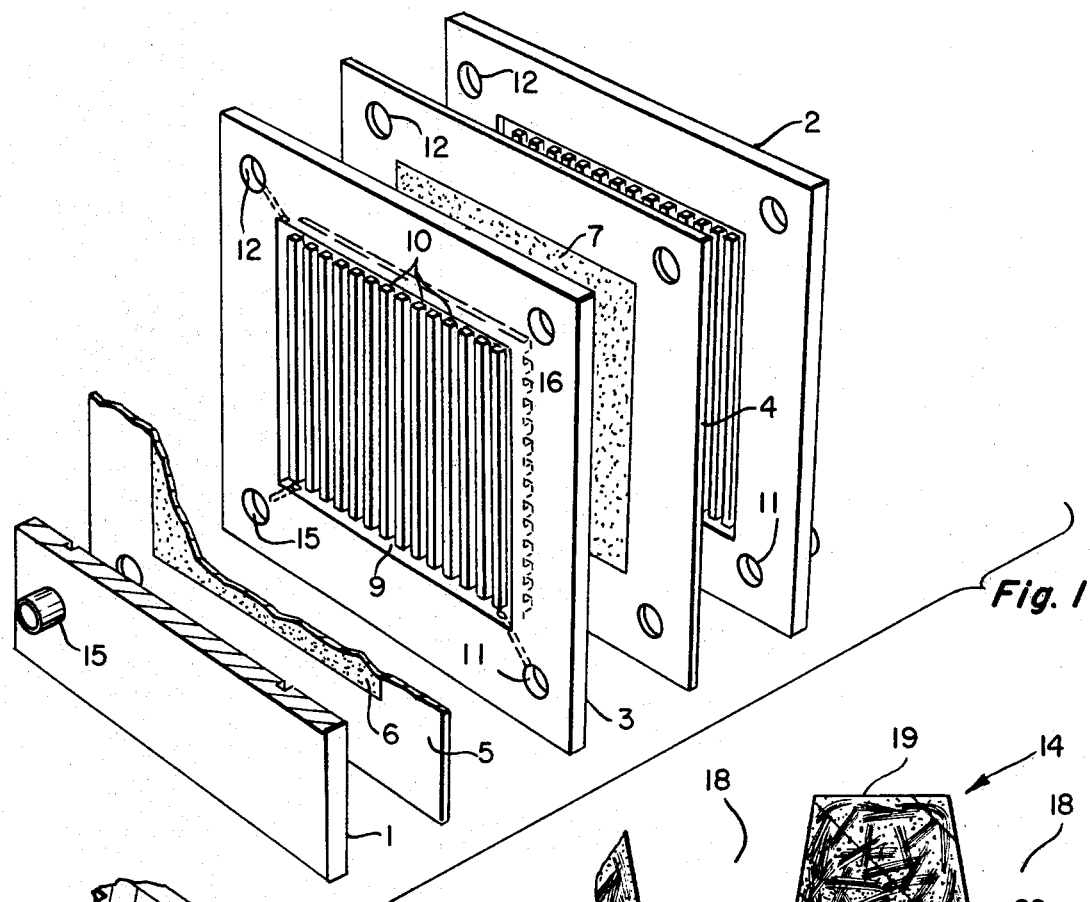
FIG. 1 is a perspective view of a cell assembly showing a bipolar molded current collector separator constructed in accordance with the invention.

FIG. 1 illustrates a multicell assembly showing two series cells connected cells separated by a fiber reinforced, bipolar, current collector-separator. It is to be understood, however, that the assembly can include any number of cell units by the use of additional bipolar separators and membranes. The cell assembly includes cathode and anode end plates 1 and 2, shown partially broken away, both of which may be molded aggregates of fiber reinforced, electrically conductive graphite particles and thermoplastic fluoropolymer resin particles. A molded, fiber reinforced graphite-fluoropolymer bipolar current collector-separator 3 is positioned between ion exchanging membranes 4 and 5 and together with end plates 1 and 2 defines the individual cell units. Membrane 4 is positioned between anode end plate 1 and one side of bipolar collector-separator 3 to form one cell and membrane 5 is positioned between the other side of bipolar collector separator 3 and cathode end plate 1 to form the second cell. Cathode electrodes 6 and 7 are bonded to one side of each of the ion exchanging membranes and anode electrodes, not shown, are bonded to the other surface. Cathode electrodes 6 and 7 as well as the anode electrodes are gas and liquid permeable and preferably porous bonded mixtures of catalytic particles and a hydrophobic binder. The electrodes are physically bonded to the membranes so that the electrode and the membrane become a unitary structure with the electrode conforming to the surface variations of the membrane as it flexes or changes dimension during operation of the electrochemical cell.

The catalytic particles forming part of the electrodes are preferably those of the platinum group metals, either in the form of pure metals or as reduced oxides of these metals. The hydrophobic resin particles are preferably fluorocarbons (polytetrafluoroethylene) such as those sold by the DuPont Corporation under its trade designation TEFLON.

The molded, fiber reinforced graphite/fluoropolymer bipolar current conductor-separator 3 has a central anode chamber 9 containing a plurality of generally vertical electrode contacting ribs 10. An anolyte inlet conduit 11 and an anolyte outlet conduit 12 communicate with chamber 9 to permit the introduction of anolyte and to allow removal of spent anolyte and electrolysis products. Similarly, anode end plate 2 has a central chamber and corresponding vertical ribs. Inlet and outlet conduits permit introduction of anolyte and removal of spent anolyte and electrolysis products. Cathode end plate 1 has a chamber, not shown, which contains a plurality of ribs which contact cathode 6 bonded to membrane 5. The other side of the bipolar current conductor (as may be seen most readily in FIG. 3) also incorporates a central chamber with a plurality of elongated ribs 14 which are angularly disposed with respect to the ribs on the other side of the bipolar current conductor. Catholyte inlet and outlet conduits communicate with the central chamber in cathode end plate 1 and inlet and outlet conduits 15 and 16 of the bipolar collector to permit introduction of catholyte, where necessary, and removal of spent catholyte electrolysis products from the cathode chamber, not shown, on the other side of current-collector separator 1.

Membranes 3 and 4 are cation exchange membranes and preferably perfluorosulfonic acid membranes of the type sold by the DuPont Corporation under its trade designation Nafion. Cathode 6 and 7 may be bonded agglomerates of graphite, platinum group metals such as platinum, ruthenium, rhodium, palatium, irridium, osmium or alloys thereof iron, silver and gold. The anodes, not shown, may be of platinum group metals such as platinum, ruthenium, rhodium, as well as oxides or reduced oxides or alloys thereof; alone or together with other platinum group metals, oxides thereof reduced oxides, or in combination with valve group metals (Ti, Ta, Nd, Zn, Af, etc) and oxides or reduced oxides of such valve group metals. Suitable openings are provided at opposite corners of the membranes 3 and 4 and are aligned with the anode and cathode inlet and outlet conduits. Current is applied to the current collectors and hence to the electrode by means of the cathode and anode end plates, which are provided with suitable tabs, now shown, which are connected to the positive and negative terminals of a source of DC power, as is customary in bipolar cell stacks.

When assembled, the conductive projections in the form of the elongated ribs 10 and 14 contact the electrodes at a plurality of points while at the same time providing parallel fluid distribution channels for the anolyte and catholyte as well as for the gaseous electrolysis products such as hydrogen, oxygen, chlorine, etc. Durng operation, an aqueous anolyte such as brine, aqueous hydrogen chloride, or water, etc. is introducted into anode chamber 9 of both cells through inlet 11. The anolyte is introduced under pressure and passes upward through the channel formed by ribs 10 and is electrolyzed at the anode electrodes, not shown, bonded to the other side of membranes 4 and 5, producing a gaseous product such as chlorine or oxygen in the case of brine, HCl or water feed stocks. The gas and spent anolyte are removed through opening 12. The catholyte, such as water or diluted caustic in the case of brine electrolysis, is introduced into the cathode chambers, not shown through the cathode inlet 15, and passes through the horizontal distribution passages of the cathode chambers (as shown at 14 in FIG. 3). The cathode electrolysis products such as caustic and hydrogen in the case of brine electrolysis and hydrogen in the case of HCl or water electrolysis are evacuated from the cathode chamber via outlet conduit 16.

During electrolysis gases are evolved at the anode ($Cl_2$ or $O_2$) along with cations, sodium ($Na+$) in the case of brine electrolysis, hydrogen ($H+$) in the case of water or HCl electrolysis. These cations migrate through the ion transporting membranes to the cathode electrode and depending on the process, are either discharged as hydrogen gases or are combined with hydroxyl ions ($OH-$) to form caustic depending on the process being carried out. These electrolysis products are, as pointed out above, then removed through outlet conduit 16.

Figure 2:
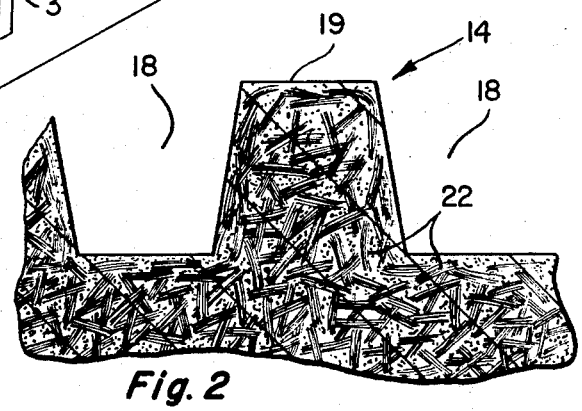
FIG. 2 is a partial section of the bipolar current collector of FIG. 1 along lines AA of FIG. 1.

As may be seen more clearly in FIG. 2, the vertical ribs of collector 3 form a plurality of anolyte fluid distribution channel 18 through which the anolyte passes and is brought in contact with the anode electrode bonded to the membrane. Each of the ribs has a surface 19 which contacts the electrode, or an intermediate screen, and through which the current flows into the electrode.

Figure 3:
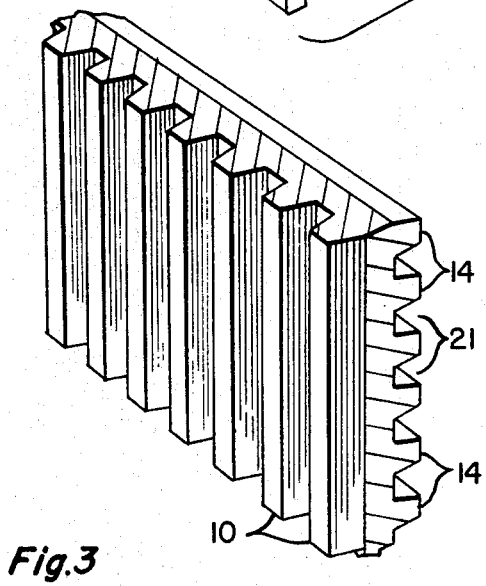
FIG. 3 is a partial, sectional prospective of the current collector of FIG. 1.

The cathode end plate and the other side of the bipolar collector, as shown in FIG. 3, includes a plurality of horizontal current collecting ribs 20. These ribs also define a plurality of distribution channels 21 for the catholyte and for cathode electrolysis products such as hydrogen and caustic. The ribs on opposite sides of the molded bipolar current collector are angularly disposed to each other so that the bipolar current collectors in a multicell arrangement provide firm support for the ion transporting membranes. By providing ribs which are angularly disposed to each other a plurality of supporting points for the membrane are provided at the intersection of elongated ribs on opposite sides of the membrane. This provides support at a plurality of points without wrinkling or distorting the membrane and without requiring precise alignment of the ribs. The angular rib construction therefore provides a simple effective support mechanism for the membrane while eliminating or minimizing the risk of deforming the membrane.

The fiber reinforced, molded graphite fluoropolymer current collector shown in FIG. 2 contains a plurality of carbon fibers 22 randomly disposed throughout. The random angular distribution strengthens the entire bipolar plate in a flexing mode. The reinforcing carbon fibers, as will be pointed out in detail later, are randomly distributed in the graphite and fluoropolymer particle mixture and thereafter molded under temperature and pressure to produce the reinforced structure shown in FIG. 2.

Figure 4:
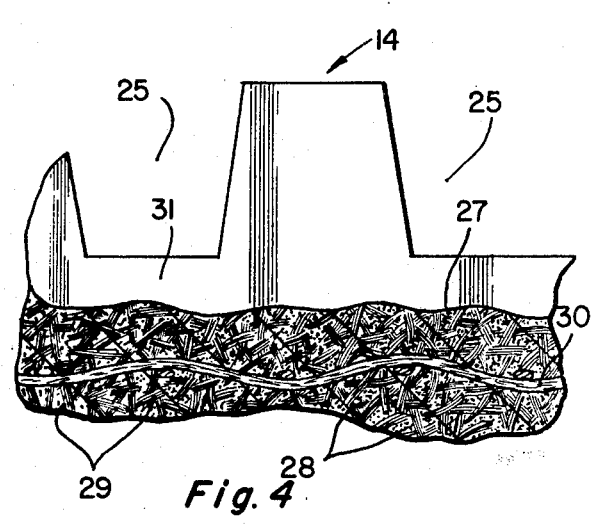
FIG. 4 is a partially broken away section of an alternative construction of a bipolar separator with a woven fiber cloth support structure in the aggregate.

An alternative embodiment is shown in FIG. 4 in which the molded carbon fluoropolymer contains both reinforcing fibers as well as a conductive reinforcing structure such as a woven carbon fiber cloth or mat which further increases the overall strength without in any way introducing losses in electrical conductivity. Thus FIG. 4 illustrates a partially broken away section of a bipolar collector having a plurality of ribbed elements 14 which define the fluid distribution channels 25. The molded collector contains fluoropolymer and carbon particles shown generally at 27 and 28. A plurality of randomly distributed carbon or graphite fibers 29 as well as a woven graphite cloth 30 are positioned in the main body portion 31 of the molded bipolar collector. Although the woven conductive cloth or mat is shown in the main body portion it will be understood that such a supporting structure may be selectively incorporated in the molded collector at high stress points such as sharp corners, ribs, etc.

The molded graphite/fluoropolymer bipolar collectors illustrated in FIGS. 1, 2 and 3 have both of the surfaces exposed directly to the anolyte and catholyte fluids as well as the electrolysis product. The polyviniledene fluoropolymer-graphite molded composition has been found to be corrosion resistant to such anolytes as brine, HCl and such electrolysis products as chlorine and other halogens, hydrogen, caustic, etc. However, in the case of water electrolysis the oxygen evolved at the anode has a tendency to attack the graphite or carbon particles forming the current collector. It has been found preferable in the case of bipolar current collectors for water electrolyzers, to modify the bipolar collector so that the anode sides are covered by a thin metallic foil which protects the fluoropolymer/graphite surface from the oxygen generated at the anode. The anode side of bipolar collector is covered by a conductive metallic foil which blocks oxygen evolved at the anode and passing through fluid distribution channels 36 from the graphite/fluoropolymer collector thereby preventing the oxygen from attacking the graphite particles and corroding the bipolar collector. The protective foil is attached to the molded aggregate by a combination of an adhesive and pressure. Thus, one side of the foil as well as the surface of the collector is coated with a thin layer of polyviniledene fluoride or any other suitable adhesive and foil is pressed against the surface and into the channels at the temperature of 400°–420° F. The polyviniledene fluoride acts as an adhesive between the metallic foil and the bonded aggregate.

The foil is preferably covered by a thin nonoxide forming film. The anode protective foil is exposed to oxygen and since most metals will form oxide layers which are nonconductive, the conductive foil must either be of a metal which does not passivate or its surface must be covered by a non-oxide forming film. The film may be electroplated, sputtered or otherwise deposited on the anodic protective foil. The protective foil is preferably of titanium or other metals such as Niobium, or Tantalum. The nonoxide forming film is preferably a noble metal or the platinum group. The metal foil may be from 0.5–5 mils thick with a 1 mil foil being prefered. A loading of 1.6 milligrams of the platinum group metal per square inch (0.25–1.6 mg/in$^2$) is adequate to prevent passavation of the Titanium foil while at the same time maintaining excellent conductivity.

The fiber utilized and preferred in fabricating the reinforced molded construction is a Stackpole, (NATEX) grade NS 250, Hammermilled carbon fiber of 0.25 inches mean fiber length and an average diameter of 0.05 inches.

EXAMPLES

The examples as set forth below describe a molding procedure for fabricating a fiber reinforced current collector separator which is a molded aggregate of carbon fibers, conductive graphite particles and a thermoplastic fluoropolymer. Current collectors so fabricated were tested to determine physical and elecrical characteristics such as flexural strength and resistivity at various temperatures and for different graphite/polymer compositions. Cells utilizing the current collectors were also operated in a plurality of different electrolysis cells.

A fluoropolymer, grade 461 Kynar polyviniledene fluoride 461 obtained from Pennwalt Corporation, was combined with graphite powder (Union Carbide grade GP 195) and with Stackpole Panex grade MF 250 hammermilled carbon fibers in the following weight proportions:

326 parts powdered graphite
103 parts KYNAR 461 powder,
82 parts Panex carbon fiber.

The overall mixtures thus consisted of 20% KYNAR, 16% fiber, and the balance graphite powder. The polyviniledene fluoride had an average particle diameter of 5 microns and conglomerated in sizes approximately 45 mil. The graphite particles had a 44 micron average diameter specified as 99% passing through a 325 mesh sieve. The PANEX fiber had a 0.25 mean fiber length and a mean diameter of 0.02 inches. The mixture of the fluoropolymer, the fibers and graphite was poured into a blender and blended for 25 minutes to provide a thoroughly homogenized mixture. The mixture was poured into the mold with the fibers thorough distributed in the mixture of the fluoropolymer and carbon. The mold was in the shape of the ribbed current collector illustrated in FIG. 1. The mixture in the mold was subjected to an initial compression of 2000 psi and heat was applied to bring the mixture to 300° F. The pressure was then reduced to 300 psi and the temperature raised to 400° F. Thereafter, the temperature was reduced to 290° F. for approximately 5 minutes and the pressure reduced to 200 psi and the molded aggregate allowed to cool to room temperature.

A bipolar collector was also fabricated identical in every way to the sample described but without the reinforcing fiber. The flexural strength of the reinforced and the nonreinforced bipolar collectors were then measured at various temperatures and are shown below in Table 1.

TABLE 1

| Temperature | Flexural Strength (maximum stress $\sigma$) Reinforced Sample | Flexural Strength (maximum stress $\sigma$) of Nonreinforced Sample |
| --- | --- | --- |
| 72 F. psi | 6200 psi | 5100–5400 |
| 180 F. psi | 4500 psi | 3300–3700 |
| 300 F. | 2300 psi | 1200–1400 |

TABLE 1-continued

| Temperature | Flexural Strength (maximum stress σ) Reinforced Sample | Flexural Strength (maximum stress σ) of Nonreinforced Sample |
|---|---|---|
| psi | | |

It is apparent from this data that the reinforced molded current collector has excellent flexural strength, at temperatures up to 300° F. It also shows its flexural strength is substantially better than that of a carbon/fluoropolymer molded aggregate which does not contain reinforcing fibers.

The resistivity in ohm inches of the molded current collector-separators was then determined as a function of weight percentages of the binder.

TABLE 2

Same Mold Cycle as for Table 1,

| % Binder | Resistivity |
|---|---|
| 7 | $1.93 \times 10^{-3}$ |
| 14 | $2.06 \times 10^{-3}$ |
| 18 | $2.30 \times 10^{-3}$ |
| 20 | $2.46 \times 10^{-3}$ |
| 22 | $2.68 \times 10^{-3}$ |
| 26 | $3.6 \times 10^{-3}$ |

As can be seen from Table 2 the bulk resistivity of the molded current collector is less than $4 \times 10^{-3}$ ohm in. for all compositions and ranges between $1.9-3.6 \times 10^{-3}$ ohm inches.

Electrolysis cells were then prepared utilizing molded, graphite/polyviniledene separators and end-plated. The cells were utilized for the electrolysis of brine to produce chlorine and caustic; the electrolysis of aqueous hydrochloric acid to produce chlorine and hydrogen; and the electrolysis of water to produce hydrogen and oxygen. A persulfonic acid membrane of the type sold by Dupont under the tradename Nafion was used in all instances. In the case of water electrolysis the cathode electrocatalyst was platinum black and the anode electrocatalyst was reduced oxides of platinum-iridium. In the case of both brine and HCl electrolysis the cathode electrode included was a platinum black whereas the anode electrode were reduced oxides of ruthenium-iridium.

The cells were utilized in each of these different electrolysis arrangements on the following operational conditions:

H₂O ELECTROLYSIS

An 18.5 weight % Kynar collector was fabricated and the cell operated under the following conditions:
Anolyte: $H_2O$
Temperature: 300° F.
Current Density: 1000 ASF
Unit Cell Voltage 1.74

BRINE ELECTROLYSIS—18.5 wt. % Kynar

Anolyte: Sat NaCl t 320 g/l
Temperature: 190° F.
Current Density: 300 ASF
Unit Cell Voltage: 3.65 V
Current Efficiency 88%

HCl ELECTROLYSIS—18.5 wt % Kynar

Anolyte: 8 Molar HCl
Temperature: 135° F.
Current Density 600 ASF
Unit Cell Voltage 1.66 volts
Current Efficiency 99% in all instances the cell operated satisfactorily with excellent cell voltages, no observable corrosion, and with very little voltage drop due to the molded graphite fluoropolymer current collector-separator arrangement.

While the number of specific embodiments of this invention had been shown and described above, it will, of course, be understood that the invention is not limited thereto since many modifications both in the structure and the arrangement instrumentalities employed therein may be made. It is contemplated by the appended claims to cover any such modification which fall within the true scope and spirit of this invention.

We claim:

1. A bipolar current collecting, fluid distributing, separator element for electrochemical cells for conducting current from the anode eletrode of one cell unit to the cathode electrode of the adjacent cell unit of the sort including:

(a) A pressure molded aggregate of electrically conductive carbon graphite particles and thermoplastic fluorocarbon polymer resin particles in a weight ratio of 2.5:1 to 16:1, (b) The molded aggregate having a fluid impervious main body at least one recessed chamber on one side of said main body and a plurality of spaced, conductive projections extending from the base of said chamber for contacting and permitting current flow to the electrode of cell units, (c) Means communicating with said recessed chamber to permit introduction and removal of fluids, the improvement which comprises randomly distributed, reinforcing graphite fibers within the pressure molded aggregate, the flexural strength, as determined by the maximum stress σ. of said fiber reinforced structure being substantially from 2300 to 6200 psi over a temperature range of 300° to 72° F., with the bulk resistivity being less than $4 \times 10^{-3}$ ohms/inc.

2. The current collecting bipolar, cell separating element according to claim 1 wherein said main body has recessed chambers on opposite sides thereof and a plurality of spaced, conductive projections extending from the bases of both chambers to form a plurality of fluid distributing channels on opposite sides thereof, said projections contacting and conducting current between anode and cathode electrodes of adjacent cell units.

3. The current collecting, fluid distributing element according to claim 2 wherein the spaced, conductive projections in opposite chambers are angularly disposed with respect to each other.

4. The current collecting, fluid distributing element according to claim 2 wherein said main body is further reinforced by and includes conductive carbon/graphite reinforcing structure.

5. The current collecting, fluid distributing element of claim 1 wherein the fluoropolymer is polyvinilidene fluoride.

6. The current collecting, fluid distributing element of claim 1 wherein the reinforcing fiber or structures constitutes from 10 to 80 weight percent of the conductive carbon/graphite in the molded aggregate.

7. In an electrochemical cell comprising an ion transporting membrane separating the cell into anode and cathode chamber, anode and cathode electrodes bonded to opposite sides of said membrane, current collecting, fluid distributing elements contacting the anode and cathode electrodes, the improvement comprising utilizing the current collecting fluid separating element of claim 1 as the element contacting the anode and cathode.

8. An electrochemical cell assembly having a plurality of cell units each unit containing an ion transporting membrane having anode and cathode electrodes bonded to opposite sides of the membrane, with individual cell units being separated by a bipolar current collecting fluid distributing element, the improvement comprising using the current collecting fluid distributing element of claim 2 to separate the unit and make contact between the anode and cathode of adjacent units.

* * * * *